Patented July 1, 1930

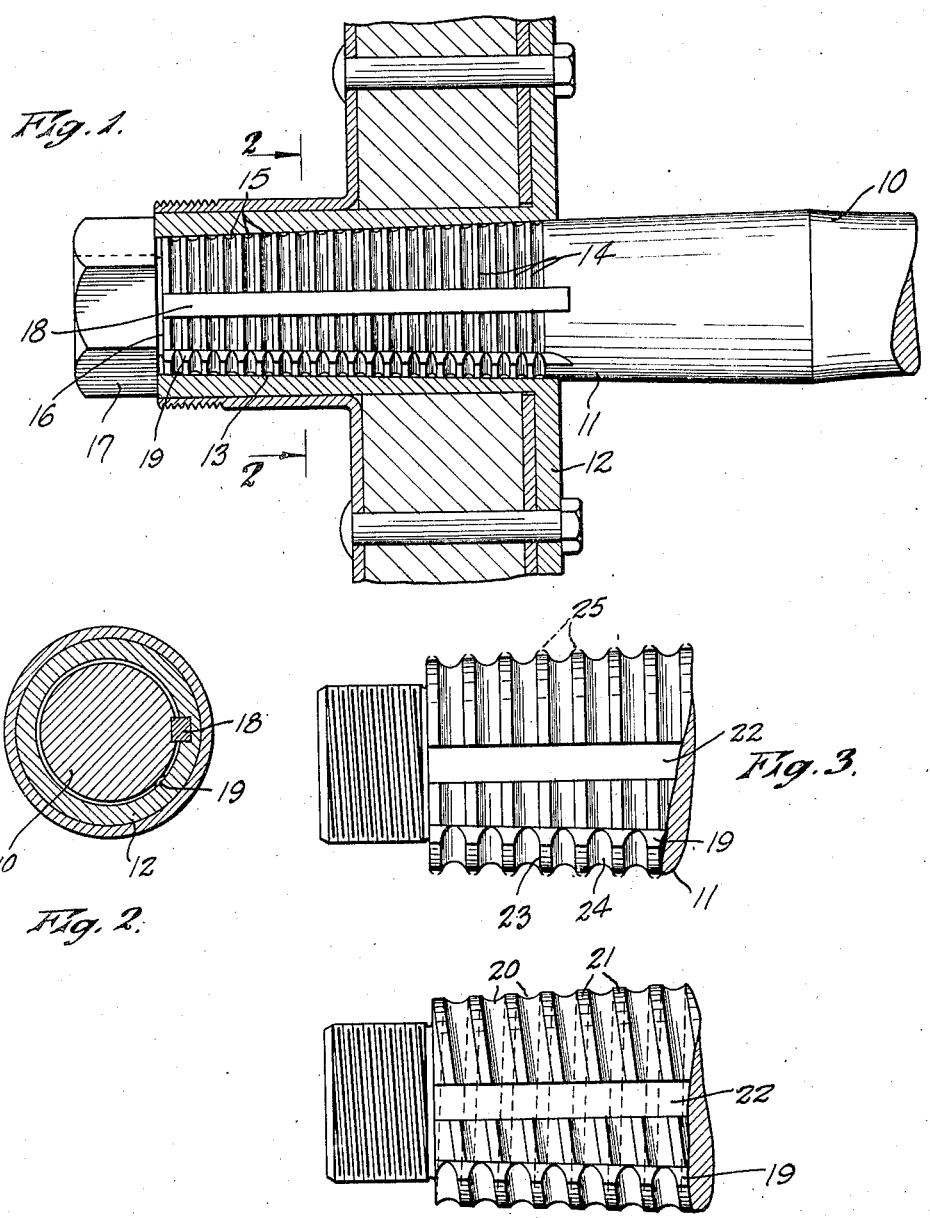

1,769,105

UNITED STATES PATENT OFFICE

WILLIAM A. BOGG, OF FAIRFIELD, CONNECTICUT

AUTOMOBILE AXLE

Application filed March 18, 1929. Serial No. 347,782.

This invention relates to a rear axle construction for motor vehicles and has for an object to provide such a construction as to facilitate removal of the wheel or wheel hub from the shaft and thus overcome the difficulties and liability of injury to the shaft and hub as are now generally experienced in removing the hub or wheel in the present construction.

With the foregoing and other objects in view the invention consists in certain novel features of construction, combinations and arrangement of parts as will be more fully disclosed in connection with the accompanying drawing.

In this drawing

Fig. 1 is a side elevation of a portion of a rear axle shaft showing my invention applied thereto and showing a wheel hub in section.

Fig. 2 is a transverse section substantially on line 2—2 of Fig. 1.

Fig. 3 is a side elevation of a portion of an axle shaft showing one way of forming my improved construction, and Fig. 4 is a similar view showing a slight change in the construction.

At the present time the common way of constructing the rear axle shaft and securing the wheel hub thereon is to form the shaft with a straight tapered portion and taper the bore through the hub in the same manner to fit this taper. The hub is keyed to the shaft so as not to turn thereon and there is a nut threaded on the shaft to press the hub onto the tapered portion of the shaft. With this construction often great difficulty is experienced in removing the hub from the shaft. Heavy, cumbersome and expensive tools have been devised for this purpose, but even with these tools it sometimes requires as long as half a day by two mechanics to get the hub off, and then the wheel or hub and the axle are ruined and have to be replaced.

The taper used is relatively small and after the hub is forced snugly on by the clamping nut and used for some time there seems to be a certain amount of sweating and more or less corrosion which causes the hub to freeze to the shaft. Also the accurate fit between the tapered surfaces drives out the air between them so that when an effort is made to separate them practically a perfect vacuum is created between them so that the pressure of the air tends to hold them together.

To overcome these difficulties I have devised a new construction of axle shaft which, although providing the requisite bearing surface between the hub and shaft to support the weight and keep them in proper relative position still greatly reduces the contact surface between them so that they are much less liable to freeze or the vacuum form to prevent their separation. The new construction readily permits the spreading of kerosene or similar light oil to practically all the contacting surfaces between them to thus loosen up these surfaces or any corrosion there may be between them.

Referring to Fig. 1, 10 represents one section of rear axle shaft and 11 represents a tapered portion on which the hub 12 of the wheel is mounted. The bore 13 of this hub is tapered to correspond with the taper of the shaft. The tapered portion embraced by the hub is provided with a series of ribs 14 extending around the shaft and spaced from each other longitudinally of the shaft by grooves 15 extending around it. The tops of these ribs are on the taper, that is, they are tapered to correspond with the taper of the bore and are in alignment so that they are really on the taper of the shaft and engage the inner surface of the tapered bore of the hub. The tapers and the lengths of the tapered portions of the hub and shaft are so proportioned that when in position the hub overhangs the shoulder 16 on the shaft so that the nut 17 will firmly press it against the shaft. The hub and shaft are provided with the usual keyways for the key 18 to secure the shaft against turning in the hub. The shaft is also preferably though not necessarily provided with a longitudinal groove 19 whereby kerosene or similar light oil may be squirted into the bore and be carried to the contact surfaces between hub and shaft by the grooves 15.

There are several ways in which this construction of shaft may be provided. The shaft may be turned and ground to the proper size and taper and then the bearing ribs provided by cutting either annular or spiral grooves at suitable distances apart. In Fig. 1 the grooves 15 are annular grooves, but in Fig. 4 the grooves 20 are shown as spiral grooves providing spiral ribs 21 having flat bearing surfaces on the taper of the shaft and to fit the tapered bore of the hub. This shaft is keyed to the hub in the usual manner, the key way being shown at 22, and the shaft also may have the longitudinal groove 19 for entrance of kerosene to loosen up the hub.

Another way of forming the ribs and grooves is shown in Fig. 3. Here the ribs 23 and grooves (which are shown as annular) are forged in the shaft and then the tops 25 thereof shown in dotted lines are ground off to the proper taper so that the flattened tops thus formed on the ribs fit the taper of the bore. This shaft also has the keyway 22 for the key 18, and it may have the oil groove 19.

It will be apparent that from this construction the contact surfaces between the hub and shaft is greatly reduced over the old construction so that even though they should corrode it will not be nearly as difficult to separate them. This construction also practically prevents the formation of sufficient vacuum between them to interfere with their separation. Still further the longitudinal groove 19 and the circular grooves bring an oil such as kerosene to practically all the surfaces to loosen any corrosion and greatly facilitate their separation.

Having set forth the nature of my invention what I claim is—

1. In a motor vehicle rear axle construction, the combination of an axle shaft having a tapered portion composed of narrow ribs spaced from each other longitudinally of the axle and having outer tapered surfaces in alignment with each other, said ribs being an integral part of the shaft, a wheel hub having a tapered bore to fit the tapered surfaces of the ribs, and means for holding the hub against turning on the shaft.

2. In a motor vehicle rear axle construction, the combination of an axle shaft having a tapered portion forming an integral part of the shaft and provided with grooves extending around the shaft providing relatively narrow spaced surfaces on the taper, a wheel hub having an opening to receive said tapered portion and correspondingly tapered, and means to hold the hub against turning on the shaft.

3. In a motor vehicle rear axle construction, the combination of an axle shaft having a tapered portion composed of narrow ribs spaced from each other longitudinally of the axle and having outer tapered surfaces in alignment with each other, said taper being provided with a longitudinal groove passing through said ribs, a wheel hub having a tapered bore to fit the tapered surfaces of the ribs, and means for holding the hub against turning on the shaft.

In testimony whereof I affix my signature.

WILLIAM A. BOGG.